Dec. 26, 1961   J. H. SHEPLEY   3,014,545
RETAINER
Filed Nov. 18, 1960
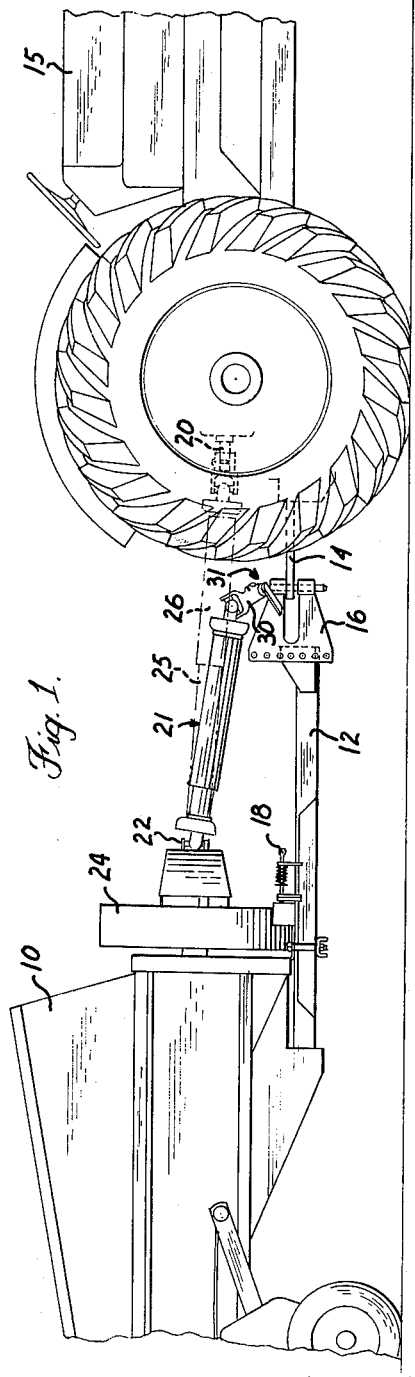
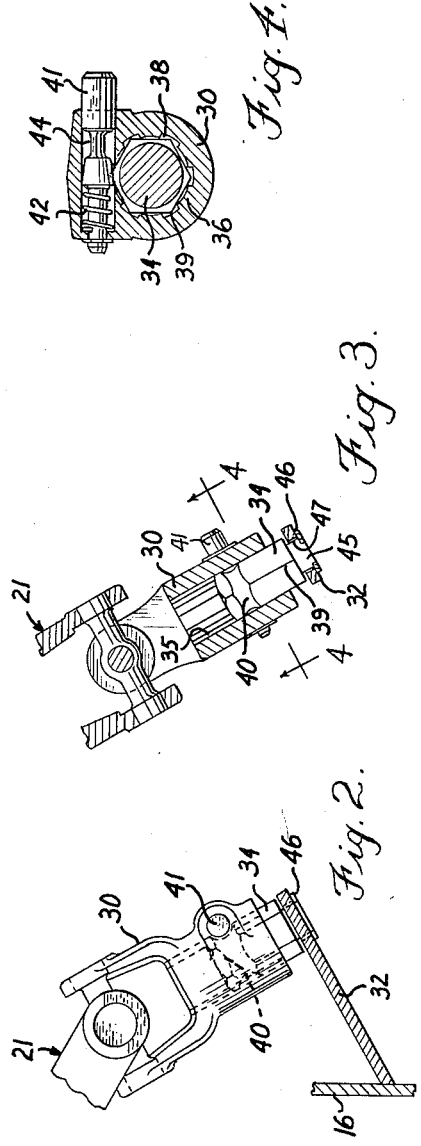
INVENTOR.
JOHN H. SHEPLEY
BY
Joseph A. Brown
ATTORNEY United States Patent Office 3,014,545
Patented Dec. 26, 1961

3,014,545
RETAINER
John H. Shepley, Lancaster, Pa., assignor to Sperry Rand Corporation, New Holland, Pa., a corporation of Delaware
Filed Nov. 18, 1960, Ser. No. 70,270
4 Claims. (Cl. 180—14)

This invention relates to a retainer for supporting the free end yoke of a power-take-off assembly of an implement when the yoke is disconnected from a source of power. More specifically, the invention relates to an improved yoke retainer particularly adapted for use on a hay baler, having however utility in relation to other implements.

Heretofore, yoke retainers have been provided for supporting separable drive shafts between vehicles. Such a retainer is shown in U.S. Patent No. 2,885,015, assigned to the assignee of this application. While the structure shown in such patent provides a substantial advance in the art, the structure employed has operable limitations. When the yoke is disconnected from the power-take-off shaft of the tractor, it is mounted on the bracket or bar which projects into the socket of the yoke. The width of the bracket is such that it will slide between certain of the splines in the yoke socket. The end of the support bracket inside the yoke is notched so that when the yoke is on the bracket, the latch pin on the yoke will project into the notch and latch the yoke to the bracket. With such structure, it is essential that the support bracket project into the space between those splines which will align the bracket with the yoke latch pin. Otherwise it is impossible to lock the yoke to the mounting bracket. This requires considerable rotatable orientation of the yoke to place it on the bracket. When the sections of the power-take-off assembly are disposed at a very sharp angle, it is difficult to rotate the yoke and the assembly has to be extended toward a lengthwise position to produce a desired rotation. Rotatably adjusting the yoke so that it will be properly oriented to be mounted on the bracket is annoying and time consuming.

The structure shown in Patent No. 2,885,015 is associated with a manure spreader. When the yoke is disconnected from the output shaft of the tractor and attached to the bracket, the yoke is locked against rotatable movement. Such is satisfactory in manure spreaders. However, locking the yoke against rotatable movement is undesirable when employed in other implements such as hay crushers and hay balers. In these machines it is desirable for various reasons to allow the yoke to rotate when it is retained. In a hay baler, for example, the draft means which connects the baler to the tractor is laterally swingable from an inboard transport position to an outboard baling position so that the baler will be laterally offset relative to the tractor when a baling operation is being performed. If the free end yoke of the power assembly of the baler is mounted on a retaining bracket and the draft means is laterally shifted, a certain rotatable movement is imparted to the yoke of the assembly. If the yoke is fixedly mounted, the retaining bracket and/or the assembly will be damaged.

Further, it is highly desirable to provide a firm and adequate support for the yoke of the power-take-off assembly. A flat bracket projectable into only two of the splined spaces in the yoke socket is generally inadequate. Also, it is desirable to provide means whereby the yoke can be locked to the support bracket regardless of the position of the yoke on the bracket.

One object of this invention is to provide an improved yoke retainer of the character described which is so constructed that the yoke of a power-take-off assembly may be mounted thereon quickly and easily.

Another object of this invention is to provide a yoke retainer member which is rotatably mounted whereby it may be properly oriented to receive the yoke which it is to support and permit rotation of the yoke when the yoke is mounted thereon.

Another object of this invention is to provide a yoke retaining member which is so constructed that the yoke of any conventional type power-take-off assembly may be mounted thereon and latched thereto against axial movement.

A further object of this invention is to provide yoke retaining structure which will allow rotatable movement of the yoke of the assembly when the yoke is mounted in place whereby no damage will result to the assembly if a rotatable force is applied to the yoke.

A still further object of this invention is to provide a yoke retainer which is made of simple parts, inexpensive to fabricate and assemble.

Other objects of this invention will be apparent hereinafter from the specification and from the recital in the appended claims.

In the drawing:

FIG. 1 is a fragmentary side elevation showing a tractor having a hay baler connected thereto, the baler being adapted to be operated by power from the tractor transmitted through a power-take-off assembly shown connected to the tractor in dotted lines and having a yoke retained when disconnected from the tractor by means constructed according to this invention;

FIG. 2 is an enlarged view of the yoke retaining means;

FIG. 3 is a longitudinal section through the yoke retaining means; and

FIG. 4 is a transverse section on an enlarged scale taken on the line 4—4 of FIG. 3 looking in the direction of the arrows.

Referring now to the drawings by numerals of reference, 10 denotes a baler having draft means 12 connected to the draw bar 14 of a tractor 15 through hitch means 16. The draft means 12 is laterally swingable relative to the baler about a vertical axis so that the draft means can be positioned in an inboard or outboard position for baling or road transport, as desired. A latch 18 is provided to lock the draft means in laterally adjusted position.

Tractor 15 has a power output shaft 20 to provide a source of power for operating the baler. The baler has driven shaft means in the form of a power-take-off assembly 21 connectable to shaft 20, as shown in dotted lines in FIG. 1, whereby power from the shaft may be transmitted through the assembly to the baler. Assembly 21 has an inner end 22 permanently connected to the baler through means which includes a flywheel 24. The assembly has telescopic members 25 and 26 whereby it can be extended and retracted. When extended, the yoke 30 on the free end of assembly 21 is adapted to be connected and latched to the shaft 20 of the tractor. The assembly 21 is connected to shaft 20 when a baling operation is being performed. However, when the baling is completed, the assembly is disconnected from shaft 20. When the baler is in transport, and not in baling use, it is desirable to support assembly 21 so that it will not bounce around on the draft means 12. Such movement of the assembly might cause damage to the assembly structure and to the draft means. The assembly 21 is adapted to be retracted as shown in solid lines in FIG. 1 and mounted on yoke retaining means 31 constructed according to this invention and shown best in FIGS. 2–4.

Hitch means 16 has an outwardly extending bracket 32 welded or otherwise affixed thereto. Mounted on bracket 32 is a hexagonal pilot member 34 onto which yoke 30 is mounted. Yoke 30 has a socket having internal splines 36 (FIG. 4) and between these splines are spaces 38.

The conventional yoke of a power-take-off assembly has six splines and six spaces therebetween. The hexagonal member 34 has six corners 39 each of which projects into one of spaces 38 between the splines. Therefore, when the yoke 30 is mounted on the hexagonal pilot member 34, the corners 39 project into the spaces 38 and lock the yoke against rotatable movement relative to the member.

As shown best in FIG. 3, the axial end of the pilot member inside the yoke has an annular groove 40 adapted to receive a pin 41 carried on the yoke. Pin 41 extends transverse to the longitudinal axis of member 34 and is shiftable relative to the yoke against the resistance of a spring 42. Pin 41 has a relieved portion 44 whereby when the pin is pressed inwardly against the spring 42 the yoke may be slid onto the pilot member. When released, the pin assumes its normal position and a portion thereof projects into the recess 40 of the pilot member. The axial length of the recess 40 is greater than the diameter of pin 41. This is provided so that variations in the dimensons of conventional power-take-off yokes can be accommodated by the pilot pin 34. The recess 40 is so designed that it will receive the pin on any conventionally presently manufactured yoke of a power-take-off assembly as used on agricultural implements.

An important feature of this invention is that the hexagonal pilot member 34 is pivotally mounted instead of being fixedly mounted on the bracket 32. The member 34 has a reduced portion 45 which projects through member 32 and has a washer or the like 46 fixedly connected to it. The member 32 has an opening 47 through which the portion 45 projects, such opening being of larger diameter than the portion 45 whereby the member 34 may rotate freely in the support member.

With the power-take-off assembly connected to the tractor as shown in dotted lines in FIG. 1, the yoke 30 may be disconnected from the shaft 20 and connected to the member 34 simply and easily. The operator merely unlatches the yoke from shaft 20 and telescopes the sections 25 and 26 together to reduce the length of the assembly. He then mounts the yoke 30 onto the member 34 by sliding the yoke over the member. Since the corners 39 of the hexagonal member must project into the grooves 38 of the yoke, some rotatable movement of the parts relative to each other may be required. However, since the mounting member 34 is freely rotatable, no rotation of the power-take-off assembly yoke is required. Holding the yoke 30 in one hand, it may be placed adjacent outer end of the mounting member 34 and then the mounting member can be rotated with the other hand using the washer 46. When the corners 39 come into register with the longitudinal slots or spaces between the splines of the yoke, the yoke will readily slide onto the pilot member. The pin 41 will be projected into the recess 40 to lock the parts against axial movement.

When the yoke is mounted in place, it is locked against longitudinal movement relative to its support. However, the yoke may rotate, such rotation being transmitted through the pilot member to the support bracket 32 through the pivotal connection between the parts. Therefore, if there is any turning movement of the yoke, for example, when the draft means 12 is shifted relative to the baler, such movement will readily be taken care of by the swivel connection of the pilot member to the bracket member.

It will be apparent that the rotatable position of the pilot member 34 relative to the yoke 30 is immaterial except that the corners 39 must project into the spaces 38 in the yoke. However, any corner may fit into any space. There is no requirement that a particular corner fit into a particular space. Likewise, since there is a projection of the support member into all of the spaces between the splines, the pin 41 has a firm engagement with one of the corners of the pilot members and holds the yoke securely to the retainer.

The structure provided is of extremely low cost, both in fabrication and assembly. Hexagonal stock of desired size is used and fabricated to provide the recess 40 and the neck 45 of reduced diameter. The simple washer member 46 provides means for attaching the pilot member to the bracket 32. The operator is able to disconnect the power-take-off assembly from the tractor and mount it on the retaining structure with a minimum of time and effort.

While this invention has been described in connection with a particular embodiment thereof, it will be understood that it is capable of further modification, and this application is intended to cover any variations, uses, or adaptations of the invention following, in general, the principles of the invention and including such departures as come within known or customary practice in the art to which the invention pertains and as fall within the scope of the invention or the limits of the appended claims.

Having thus described my invention, what I claim is:

1. An agricultural implement having draft means connectable to a tractor and a power-take-off assembly including a yoke at one end connectable to the output shaft of the tractor, a bracket mounted on said draft means, and means on said bracket for detachably securing said yoke to the draft means when the yoke is not connected to said output shaft, said means comprising a member interfitting with said yoke, means detachably locking said yoke to said member, and means rotatably mounting said member on said bracket whereby the member may be properly oriented for connection with said yoke.

2. An agricultural implement having draft means connectable to a tractor, driven telescopic shaft means supported on said implement, a universal joint assembly at one end of said shaft means, said assembly including a yoke having an internally splined socket connectable to an output shaft of said tractor, a bracket mounted on said draft means, and means on said bracket for detachably securing said yoke to said draft means when the yoke is not connected to said output shaft, said means comprising a member on which said yoke is mountable with the member projecting into said socket and engaging the splines to prevent rotatable movement of the yoke relative to the member, means detachably interconnecting said yoke and member to prevent axial movement of the yoke relative to said member, and means mounting said member on said bracket for rotatable movement about the axis of said yoke whereby said member may be properly oriented for reception of said yoke.

3. An agricultural implement having draft means connectable to a tractor, driven telescopic shaft means supported on said implement, a universal joint assembly at one end of said shaft means, said assembly including a yoke having an internally splined socket connectable to an output shaft of said tractor, a bracket mounted on said draft means, and means on said bracket for detachably securing said yoke to said draft means when the yoke is not connected to said output shaft, said means comprising a hexagonal member on which said yoke is mounted with the member projecting into said socket, said member having corners projecting into the spaces between successive splines in said socket to lock said yoke against rotatable movement relative to said member and having an annualr recess on an inner end of the member, a pin on said yoke extending transverse to the longitudinal axis of said member, said pin being shiftable and projectable into said socket and said recess to detachably lock said yoke against axial movement on said member, said pin having a diameter materially less than the axial length of said recess, and means connecting an opposite end of said member to said bracket for rotatable movement about the longitudinal axis of the member whereby the member may be properly oriented to receive said yoke.

4. A hay baler having draft means connectable to a tractor, a flywheel rotatably mounted on said baler, driven telescopic shaft means supported on said implement, means connecting one end of said shaft means to said flywheel, a universal joint assembly at the opposite end of said shaft means, said assembly including a yoke having an internally splined socket connectable to an output shaft on said tractor, a bracket mounted on said draft means, and means on said bracket for detachably securing said yoke to said draft means when the yoke is not connected to said output shaft, said yoke securing means comprising a member on which said yoke is mounted with the member projecting into said socket, said member having portions projecting into all of the spaces between successive splines in said socket to lock said yoke against rotatable movement relative to said member and having an annular recess on an inner end of the member, means on said yoke and projectable into said recess to detachably lock said yoke against axial movement on said member, and means connecting an opposite end of said member to said bracket for rotatable movement about the longitudinal axis of the member whereby the member may be properly oriented to receive said yoke.

References Cited in the file of this patent

UNITED STATES PATENTS

| | | |
|---|---|---|
| 2,885,015 | Koch et al. | May 5, 1959 |
| 2,926,034 | Weaver | Feb. 23, 1960 |